Aug. 31, 1965    H. S. YOUNG    3,204,239
AERONAUTICAL DEVICE ADAPTED TO BE DISCHARGED
FROM AN AIRBORN CARRIER
Filed March 8, 1961    2 Sheets-Sheet 2
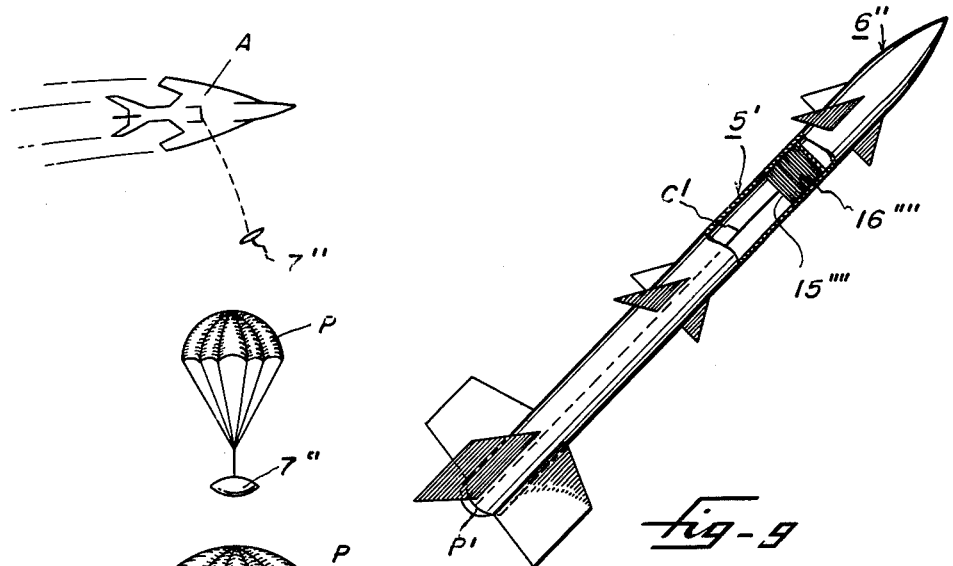
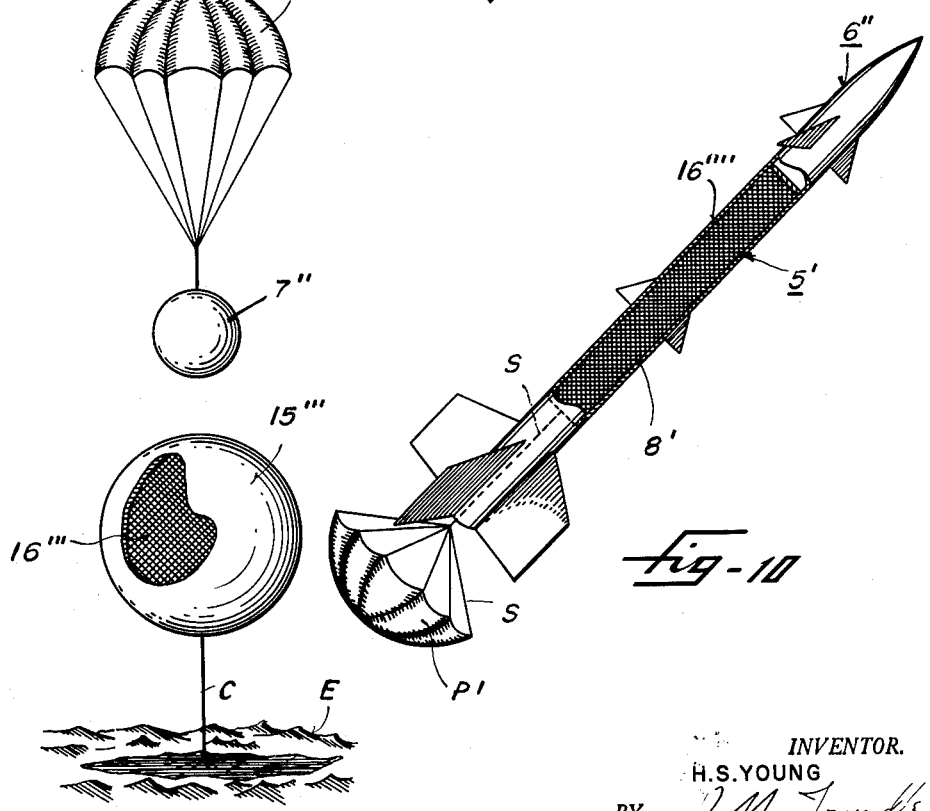
INVENTOR.
H. S. YOUNG
BY
ATTORNEY 3,204,239
AERONAUTICAL DEVICE ADAPTED TO BE DISCHARGED FROM AN AIRBORNE CARRIER
Harold S. Young, 315 Kimball Terrace, Chula Vista, Calif.
Filed Mar. 8, 1961, Ser. No. 94,338
12 Claims. (Cl. 343—18)

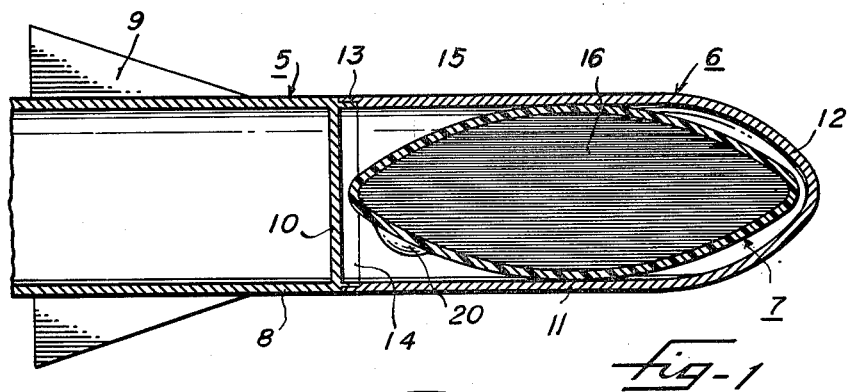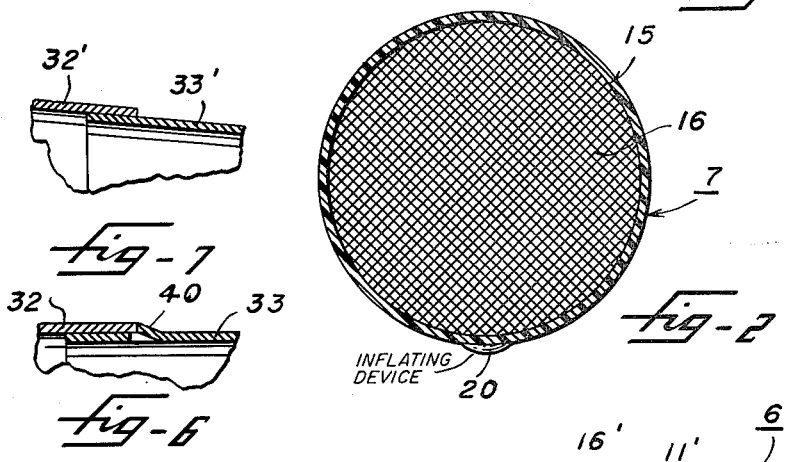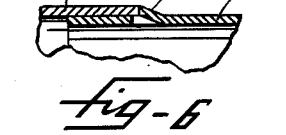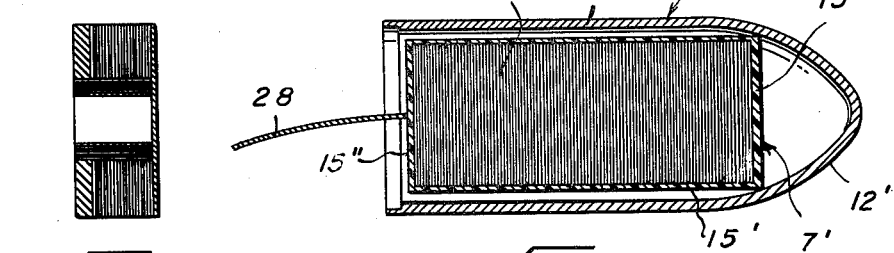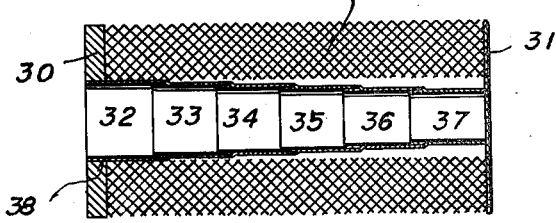

The present invention relates to improvements in aeronautical and outer space devices, and more particularly to an inflatable envelope having a collapsible and expansible metallic filler.

One object is to provide a device of the above-mentioned character which when expanded will be reinforced against excessive pressures, and when the filler is formed of metallic honeycomb material will form a reflector for radar and other electronic signal devices.

Another object is to provide a relatively thin-skinned plastic envelope of a geometrical shape having a collapsible honeycomb core structure which can be expanded rapidly from its collapsed condition and maintain the device in a predetermined shape and reinforced in all directions.

Another object is to provide a device of the above-mentioned type which is capable of being used as an outer space satellite, and when so used can be projected in the nose cone of a missile and released by expanding the envelope with a small amount of gas which causes the honeycomb core structure to expand with the envelope from its contracted position to one in which it is fully expanded.

Another object is to provide a device of the above-mentioned type which can be projected from an aircraft and expanded to form a captive radar balloon capable of forming a false target for hostile radar homing missiles.

Another object resides in novel means for expanding the honeycomb core structure from its collapsed position such as when stored in a missile stage or section of a multi-stage missile.

Another object is to provide a device which is adapted to be used as a satellite and includes a relatively thin-skinned plastic envelope having a core structure of aluminum honeycomb arranged such that the honeycomb structure can be collapsed to permit the device to be stored in the nose cone of a missile and to provide means for creating a small pressure within the envelope so that the envelope will be inflated and the honeycomb core structure expanded simultaneously. This is accomplished by attaching the outer edge portions of the honeycomb structure to the thin plastic envelope by metal to non-metal bonding agent.

Another object is to provide a device which can be used as a satellite, and which is adapted to be stored in the nose cone of a missile with a parachute attached to the envelope and honeycomb structure so that when the satellite is released by displacement of the nose cone the parachute will expand the honeycomb structure by creating a drag thereon. The reduced outer space pressure is relied upon to complete the expansion of the unit with the parachute permitting return to a predetermined height which may be established by a suitable leveling device.

Another object resides in the provision of a device which when used as a satellite and when released from the nose cone of a missile will be expanded uniformly along a predetermined direction, and to provide means for guiding the expansion in one direction only.

Other objects and advantages of the invention will become apparent during the course of the following description of the accompanying drawings wherein:

FIGURE 1 is a fragmentary sectional view of a rocket carrier showing the manner in which the inflatable collapsed envelope is stored in the nose cone thereof.

FIGURE 2 is a diametral cross-sectional view of the device or balloon showing the same expanded and illustrating the honeycomb structure forming a core therefor.

FIGURE 3 is a longitudinal cross-sectional view similar to FIGURE 1 of a modified form of the invention in which the expandible balloon or satellite is of cylindrical form.

FIGURE 4 is a dimetral cross-sectional view of another modified form of the invention illustrating guide means for the core structure which is arranged between two movable plates.

FIGURE 5 is a longitudinal cross-sectional view of the modified form of the invention shown in FIGURE 4 and showing the core structure expanded with the telescopic guide sections elongated.

FIGURE 6 is a detailed cross-sectional view showing latch means for holding the telescoped sections in FIGURES 4 and 5 in their expanded position.

FIGURE 7 is a detailed cross-sectional view of a slightly modified telescopic guide in which the sections are tapered.

FIGURE 8 is a progressive view of the device shown in FIGURES 1 and 2 illustrating the manner in which the same may be used and discharged from an aircraft to provide a captive target capable of forming a false target for hostile missiles.

FIGURE 9 is a perspective view of a missile showing a portion broken away to illustrate the manner in which the inflatable and expansible device shown in FIGURE 3 may be stored in the missile, and FIGURE 10 is a perspective view of a missile partly in section and similar to FIGURE 9 showing the manner in which a parachute may be used to expand the honeycomb structure and plastic envelope therefor.

In the drawings, and more in detail, attention is first directed to FIGURES 1 and 2 wherein there is shown a preferred embodiment of the invention, and in which the numeral 5 generally designates a missile of the single or multi-stage type to which is attached a nose cone generally designated 6. The inflatable and expansible envelope is mounted in the nose cone and generally designated 7. The missile 5 comprises a shell-like member 8 having the usual stabilizer fins 9 and a closed upper end wall 10. The nose cone 6 is formed cylindrical by means of a shell-like member 11 terminating at the front end in a streamlined point 12 and having its rear end chamfered as at 13 to be slidably received on a correspondingly shaped portion of the shell 8.

The expansible and inflatable satellite 7 includes an outer plastic envelope 15 formed of a synthetic plastic material sold by E. I. du Pont under the name of Mylar. The outer skin or envelope 15 of the satellite or other device has a tensile strength of 15,000 pounds per square inch when manufactured in sheets having a thickness of .00005 of an inch. This material is not materially affected when subjected to the extremely high and low temperatures of heat and cold and sudden change between extreme temperatures. The core structure 16 is formed of honeycomb material which may be of either plastic or light metal. One form of honeycomb structure capable of being used is the type formed of relatively thin gauge aluminum foil secured together at staggered points and sold for use in the aircraft industry in making and producing various reinforced fuselage parts. United States Patent 2,855,664, issued October 14, 1958, to C. G. Griffith et al., shows a typical honeycomb structure capable of being employed in the present invention. The honeycomb structure 16 is shaped as shown in FIGURE 1 in its compressed form so that it will be received in the nose cone 6, and it is intended to provide an inflating device 20 of the automatic type which includes a chemical which when mixed with water or upon liquid contact forms a gas. Such a device is shown in United States Patent 1,329,990 issued February 3, 1920. Other types of inflating devices can be used in which a gas pressure tank is ruptured to release the gas such as shown in United States Patent 2,627,998. Various chemical substances can be used for releasing the automatic inflating device such as shown in United States Patents 2,684,784 and 2,722,342. However, any type of cartridge device can be used which contains compressed air capable of being released into the plastic or rubber envelope at a predetermined altitude controlled by a suitable pressure responsive device.

One type of inflating device which can be successfully used is the cartridge type device shown in United States Patent 2,888,675 in which a valve is normally held in position to close the cartridge which is ruptured by a spring pressed plunger. In the present case the plunger can be retained in its inoperative position by a pressure responsive diaphragm instead of the soluble capsule.

The honeycomb structure 16 has its outer edges bonded to the interior wall of the balloon-like envelope 15 and this bond may be accomplished by one of the many metal to non-metal adhesives now on the market and sold under a number of different names.

In operation, the missile is projected as usual and the nose cone 6 separates therefrom at a predetermined altitude. When this occurs the balloon-like satellite 7 will be discharged and will be inflated by the device 20 so that it will be expanded as shown in FIGURE 2.

In the modified form of the invention shown in FIGURES 3 to 6 inclusive the nose cone 6' is the same as before and includes a shell 11' terminating in a pointed end 12'. The satellite includes a round structure 7' which is formed of a cylindrical plastic envelope 15' constructed of relatively thin gauge rubber or synthetic plastic such as Mylar and closed at its ends with round wall portions 15''. The honeycomb core structure 16' is arranged so that it will be elongated in a direction axially of the cylindrical wall 15' when the structure is expanded. A cord or cable 28 is attached to one of the walls 15'' and may be provided with a parachute to assist in expanding the honeycomb structure when the satellite is released and placed in orbit.

The structures shown in FIGURES 5 to 6 inclusive are similar to the honeycomb structure 16' in FIGURE 3. In FIGURE 5 the expanded honeycomb is shown at 16'' and is provided with end wall plates 30 and 31 connected by a series of telescopic tubes 32 to 37 inclusive. The tube 32 is mounted in an opening 38 in the plate 30, while the tube 37 is secured to the plate 31 by welding or the like. The sliding sections of the telescopic tubes 32 to 37 inclusive are provided with upstruck portions 40 (FIGURE 6) to abut the edge of an adjacent section and thus hold all of the sections elongated.

In lieu of the structure shown in FIGS. 3 to 6 inclusive, the telescopic sections may be formed slightly tapered as shown at 32' and 33' respectively (FIG. 7). Thus, the friction between the inner and outer wall surfaces of the tapered sections will create a friction grip to hold the sections expanded and maintain the honeycomb structure supported thereon as shown in FIG. 5 in a fully expanded position.

As shown in the modified progressive view in FIGURE 8, the collapsed balloon-like body 7'' can be discharged from an aircraft A and have attached thereto a parachute P which is adapted to open when the balloon-like device 7'' is discharged. During the downward travel the balloon-like device 7'' will be inflated by an inflating device similar to the one shown at 20 in FIGS. 1 and 2 so that the honeycomb structure 16''' in the plastic envelope 15''' will be inflated and maintained in an expanded position. When used in atmospheric pressures the balloon-like device may be inflated with sufficient gas such as helium or the like which is lighter than air and will maintain the balloon-like device at a predetermined altitude with a captive cable C maintaining the altitude above the earth E.

In the form of the invention shown in FIGURES 9 and 10 the missile generally designated 5' is similar to that shown before, and includes an elongated shell 8' having a nose cone portion 6'' and sustaining foils or stabilizers of conventional structure. In this form of the invention the honeycomb structure 16'''' is enclosed in a plastic envelope 15'''' and has attached thereto a cable C' connected to a folded parachute P' (FIGURE 9). As shown in FIGURE 10 the parachute P' is opened after the missile reaches a predetermined altitude and exerts a rearward pull force by the parachute strands S on the plastic envelope and honeycomb core structure therein to expand the core structure and envelope from the position shown in FIG. 9 to that shown in FIG. 10. Upon further travel of the missile 5' the satellite will be displaced by the parachute P' from the missile shell 8' and may then go into orbit.

In all forms of the invention it is to be understood that the honeycomb core structure may be formed of lightweight aluminum honeycomb constructed of thin gauge aluminum foil or may be made of plastic honeycomb constructed of one of the many polyvinyl type synthetic plastic compositions. When formed of aluminum foil the core structure forms a reflector for radar and other supersonic electronic signals and when coated with a thin coating of stainless steel the reflecting properties may be increased. When the device is used as shown in FIGURE 8 the honeycomb aluminum or other metal core structure 16'' will form a reflector for a false target for missiles of the homing type from an attacking force.

It is to be understood, that various changes in the shape, size and arrangement of the inflatable balloon structure may be resorted to without departing from the spirit of the invention and its novel concept as set forth in the appended claims.

What I claim is:

1. In an aerial device, an inflatable envelope formed of air tight material, and a metallic core of collapsible multi-cellular honeycomb material in said envelope to expand with the envelope when the same is inflated, said multi-cellular honeycomb material including parallel cell walls to permit the core to expand in a direction normal to said walls.

2. In an aerial device, an envelope of relatively thin gas tight material, and a collapsible multi-cellular honeycomb core structure encased in said envelope adapted to expand therewith when the envelope is inflated, said multi-cellular honeycomb core having parallel cell walls to permit the core to expand in a direction normal to said walls.

3. In an aerial device, a relatively thin wall inflatable envelope formed of synthetic plastic material which is air and gas tight, and a multi-cellular honeycomb core structure enclosed by said envelope, said core structure being provided with connected parallel cell walls, said honeycomb core structure being adapted to be collapsed and expanded in a direction normal to the parallel cell walls with the envelope when the same is inflated.

4. In an aerial device, a relatively thin wall envelope formed of stretchable and collapsible material, and a multi-cellular honeycomb core structure having yieldingly connected parallel cell walls enclosed by said envelope adapted to be folded in a direction normal to said walls to a desired shape and adapted to be expanded upon inflation of said envelope.

5. In an aerial device, adapted to be discharged from an airborne carrier, comprising a relatively thin walled envelope formed of synthetic plastic material and a core of multi-cellular metallic honeycomb material enclosed in said envelope, said material having yieldingly connected parallel cell walls, said envelope and core structure being compressed when stored in said carrier and being adapted to be expanded upon inflation of said envelope in a direction normal to said yieldingly connected cell walls.

6. In an aerial device adapted to be discharged from an airborne carrier, comprising a flexible thin walled inflatable envelope, a multi-cellular metallic honeycomb core structure having yieldingly connected parallel cell walls enclosed by said envelope adapted to be compressed in directions normal to said walls to be received in said carrier, and means for inflating said envelope after said carrier has reached a predetermined altitude, whereby inflation of said envelope will permit the honeycomb core structure to be expanded in a direction opposite to the directions of compression.

7. In an aerial device adapted to be discharged from an airborne carrier, comprising a synthetic plastic envelope, a multi-cellular honeycomb core structure having yieldingly connected parallel cell walls enclosed by and secured to said envelope, and means for inflating said envelope when the same is discharged from the carrier, whereby said honeycomb core structure will be simultaneously expanded in directions normal to said cell walls.

8. In an aerial device adapted to be discharged from an airborne carrier, an envelope adapted to be mounted in a compartment of said carrier, a multi-cellular honeycomb core structure having yieldingly connected parallel cell walls enclosed by said envelope and adapted to be expanded in directions normal to said walls when released from said carrier to expand said envelope and a drag device attached to said envelope and core structure to cause expansion of the same upon release of said aerial device.

9. In an aerial device adapted to be stored in a compartment of an airborne carrier, comprising a thin walled envelope adapted to be collapsed when in said compartment, a multi-cellular honeycomb core structure having yieldingly connected parallel cell walls forming a plurality of separated passageways enclosed by said envelope and a parachute attached to said envelope to assist in removing the aerial device from said compartment and to expand the honeycomb core structure and envelope, said cell walls of said core structure being formed of aluminum foil extending in a plane to assist expansion of the envelope in one direction normal to said cell walls.

10. In an aerial device, a thin walled plastic and stretchable envelope, a multi-cellular honeycomb core structure having yieldingly connected cell walls within said envelope, said core structure being deformable in directions normal to said cell wall, telescopic guide means for guiding expansion of said honeycomb structure when the envelope is inflated, and means for holding said telescopic guide means extended after the envelope has been inflated and the multi-cellular honeycomb core structure expanded.

11. In an aerial device, adapted to be discharged from a compartment in an airborne carrier, comprising a relatively thin flexible and stretchable envelope, a multi-cellular honeycomb core structure having yieldingly connected cell walls forming a plurality of parallel passageways, enclosed in said envelope and compressed when received in said compartment, in a direction normal to said passageways, said honey comb core structure being expanded when released from said compartment to expand said envelope to a predetermined geometrical shape.

12. In an aerial device adapted to be mounted and discharged from the nose cone of a rocket missile, comprising a relatively thin flexible and expansible envelope fitted in said nose cone, and a multi-cellular honeycomb core structure including yieldingly connected cell walls enclosed by said envelope and compressed with the cell walls extending co-axial with the missile axis and compressed in a direction normal to the walls of said multi-cellular structure, and pressure means for inflating said envelope when the aerial device is discharged from said nose cone whereby said honeycomb core structure will be expanded in a direction opposite to the direction of compression to form a spherical satellite.

References Cited by the Examiner

UNITED STATES PATENTS

| 2,490,793 | 12/49 | Fleming | 343—18 |
| 2,888,675 | 5/59 | Pratt et al. | 343—18 |
| 3,047,860 | 7/62 | Swallow et al. | 343—18 |

FOREIGN PATENTS 1,014,610   8/57   Germany.

LEWIS H. MYERS, *Primary Examiner.*

CHESTER L. JUSTUS, KATHLEEN CLAFFY,
*Examiners.*